Jan. 22, 1963  DU WAYNE E. STEVENS  3,075,095
NUMERICAL CONTROL SYSTEM
Filed Aug. 8, 1960
9 Sheets-Sheet 1

Inventor:
DuWayne E. Stevens
By Robert F. Miehle
Atty.

Jan. 22, 1963

DU WAYNE E. STEVENS 3,075,095

NUMERICAL CONTROL SYSTEM

Filed Aug. 8, 1960

FLIP-FLOP CIRCUIT

Fig. 4

FREE RUNNING MULTIVIBRATOR

Inventor:
DuWayne E. Stevens
By Robert F. Michler
Atty.

Jan. 22, 1963  DU WAYNE E. STEVENS  3,075,095
NUMERICAL CONTROL SYSTEM
Filed Aug. 8, 1960  9 Sheets-Sheet 6

Fig. 6.

COUNTER CIRCUIT

Fig. 9.

EMITTER FOLLOWER CIRCUIT

Inventor:
DuWayne E. Stevens
By Robert H. Michle, Jr. Atty.

Jan. 22, 1963

DU WAYNE E. STEVENS

3,075,095

NUMERICAL CONTROL SYSTEM

Filed Aug. 8, 1960

AMPLIFIER

Fig. 8.

DELAY

Inventor:
DuWayne E. Stevens
By Robert F. Miehle,
Atty.

Jan. 22, 1963

DU WAYNE E. STEVENS 3,075,095

NUMERICAL CONTROL SYSTEM

Filed Aug. 8, 1960

Inventor:
DuWayne E. Stevens
By Robert F. Michle, Atty.

United States Patent Office 3,075,095
Patented Jan. 22, 1963

3,075,095
NUMERICAL CONTROL SYSTEM
Du Wayne E. Stevens, Morton Grove, Ill., assignor to Bell & Howell Company, Chicago, Ill., a corporation of Illinois
Filed Aug. 8, 1960, Ser. No. 47,993
5 Claims. (Cl. 307—106)

This invention relates to a numerical control system, and more particularly to a numerical control system for controlling a machine for grinding aspheric lens surfaces.

An object of the invention is to provide a control system actuated by pulses from a work feed to cause a tool feed to be driven and for keeping synchronism between the two feeds.

Another object of the invention is to provide novel counter circuitry actuated by pattern spaced command pulses from rotation of a work feed screw driving a work holder to control the drive of a tool feed screw in accordance with the spacing of the command pulses, and also serving to lock the drives of the screws by requiring response or monitor pulses produced by movement of the tool feed screw in order to continue the operation of the work feed screw.

A complete understanding of the invention may be obtained from the following detailed description of a numerical control system forming a specific embodiment thereof, when read in conjunction with the appended drawings, in which.

The invention provides a numerical control system which may be used with a machine for grinding an aspheric surface on a lens blank. The control system includes a bi-directional counter which receives plus count pattern spaced command pulses from a magnetic track driven by a work feed screw, the counter serving upon receipt of each command pulse to actuate a driver of a tool feed screw. The counter also receives minus count response or monitor pulses one of which is produced by a magnetic disc for a given rotation of the tool feed screw, and if the counter does not receive a response pulse after having receiver a predetermined number of command pulses it will shut down the machine. The counter also will shut down the machine if it receives a predetermined number of response pulses in excess of the command pulses received. The counter is provided with an anti-coincidence circuit which permits it to receive without loss a command pulse and a response pulse simultaneously.

Figure 1:
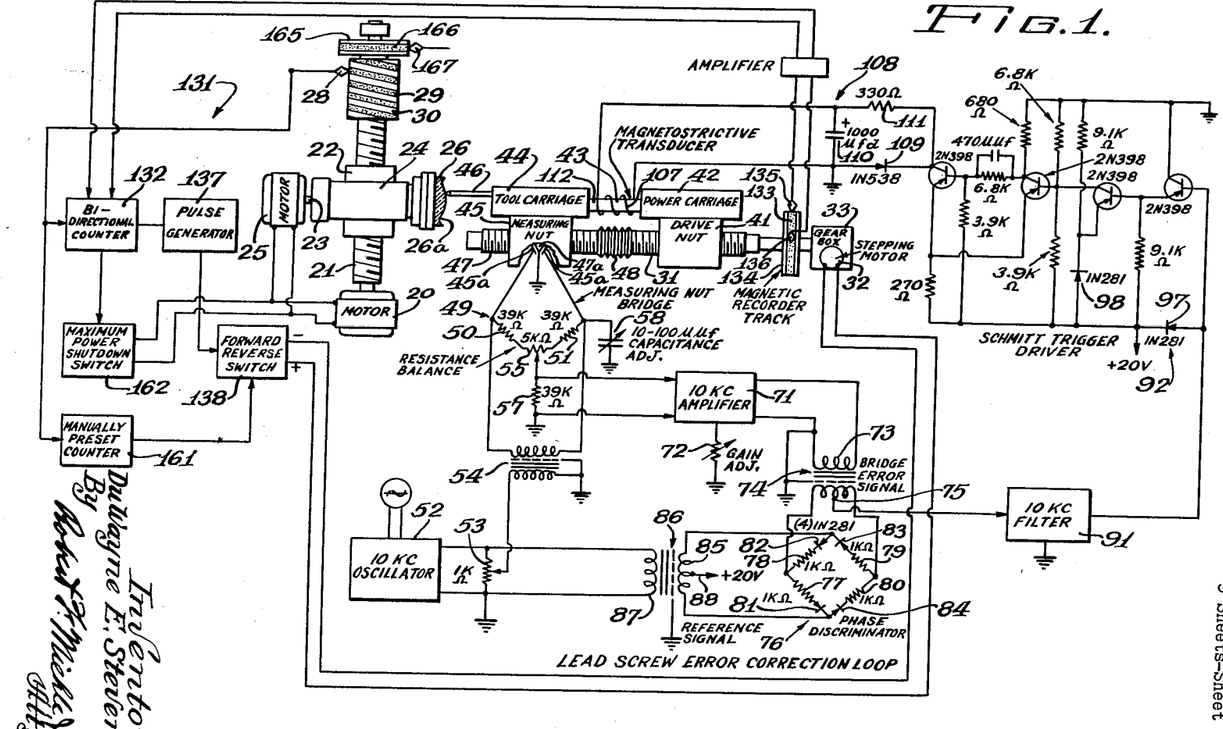
FIG. 1 is a schematic view of a numerical control system forming one embodiment of the invention together with an aspheric grinding machine with which the control system may be used.

Referring now in detail to the drawings, there is shown in FIG. 1 a motor 20, which is to rotate a very accurate work screw 21 continuously at a predetermined rate of speed. The screw extends along what is termed the X axis. Rotation of the screw advances a work carriage 22 along the X axis, and the carriage carries a spindle 23 thereon in a bearing structure 24 together with a spindle driving motor 25 to rapidly rotate the spindle together with a lens blank 26 carried by a blocking member or work holder 27 centered on and fixed rigidly to the spindle. As the carriage 22 is moved along the screw 21, a magnetic player head 28 carried by the carriage travels along a helical magnetic record track 29 on a drum 30 fixed to and rotated by the screw 21.

The pitch of the track 29 is identical with the pitch of the screw 21, and recorded pulses are spaced along the track in a predetermined pattern. These pulses are designated as command pulses and as each of these pulses is picked up by the head 28, a drive screw 31 is caused to be rotated through a predetermined small angle by a known stepping motor 32 and known reduction gearing 33. The drive screw is very precise and has an error within known limits.

The drive screw 31, when rotated, serves to drive a drive nut 41 along an axis which is designated the Y axis and is transverse to the X axis. The drive nut is rigidly connected to a power carriage 42, which is rigidly connected by a magnetostrictive transducer device 43 to a tool carriage 44. The tool carriage 44 carries a measuring nut 45 and a known abrading tool 46 rigidly thereon. The tool 46 may be non-rotating as shown or may be rotated by a motor (not shown) on the tool carriage. The measuring nut 45 extends along a portion of a measuring screw 47, and, with the screw 47, forms an electrostatic screw measuring device of the type disclosed and claimed in co-pending application Serial No. 824,665, filed July 2, 1959, by Gerhard Lessman and assigned to the common assignee. The measuring screw is aligned with the drive screw 31 and is drivingly connected thereto by a bellows coupling 48. The pitches of the threads of the screws 31 and 47 and the nuts 41 and 45 are equal.

Threads 47a of the screw 47 and 45a of the nut 45 overlap one another and form two capacitors which are connected in adjacent arms of a bridge circuit 49. The capacitances of these two capacitors are equal only when the nut 45 is in the desired position thereof along the screw 47 and when the nut is in a position shifted along the screw 47 from its desired position, one of the capacitors increases in capacitance and the other decreases, both changes being proportional to the square of the distance of shift or longitudinal decentering. The bridge circuit 49 also includes equal resistors 50 and 51 in its other arms and is supplied with power from an oscillator 52, a voltage divider 53 and a transformer 54. The bridge circuit also includes a trimming or balancing variable resistor 55 whose contactor 56 is connected to voltage divider 57 forming the output of the bridge circuit and receiving any error output from the bridge circuit due to any occurring inequality of the pair of capacitors formed by the threads 45a and 47a. An adjustable capacitor 58 is connected between one corner of the input of the bridge circuit and ground and is used for initially balancing the bridge circuit.

Any error output of the bridge circuit 49 is fed to a known amplifier 71 adapted to amplify ten kilocycle frequency signals and having a rheostat 72 for initially adjusting the gain thereof. The amplified error signal is fed to a winding 73 of a transformer 74 which also has a center tapped winding 75. The center tapped winding 75 has its ends connected to a phase discriminator circuit 76 including resistors 77 to 80 and rectifiers 81 to 84 and connected at its input to center tapped secondary winding 85 of transformer 86, primary winding 87 thereof being supplied by the oscillator 52. The center of the winding 85 is supplied with a constant positive D.C. voltage by conductor 88 leading to a known D.C. source (not shown). The phase discriminator circuit serves to detect the error signal by the phase difference between the reference signal and the error signal. An input diode 97 cancels out any pulses from the bridge circuit which are due to lead of nut 44 from its desired centered position when the nut 45 is being driven to the left as viewed in FIG. 1. Normally such pulses from lead of the nut 44 do not occur because the nut 45 is coupled to the power or drive carriage 42 so that, with no current supplied to the coupling magnetostrictive device 43, the nut 45 will lag from its desired longitudinally centered position relative to the thread 47a of screw 47. However, this lag is never great enough to cause the thread 47a to engage the thread 45a of the nut. Hence, only error signal due to lag of the nut 45, the term lag being designated to be lag for driving movement of the nut 45 to the left, is utilized for error compensation.

The lag and lead error signals are fed with the ten kilocycle frequency reference signal to a ten kilocycle filter 91 of a known type which filters out the reference signals leaving only the amplified error signals or pulses, which then are fed to a trigger circuit 92 of a known type. The trigger circuit includes transistors 93 to 96, diode rectifiers 97 and 98, resistors 98 to 105 and a capacitor 106. The rectifier 97 cancels out lead error signals. The trigger circuit is turned on when the D.C. input thereto rises above its threshold voltage, which occurs only for each error input pulse of a magnitude at least as great as that of an error pulse produced by a lag of the nut 45 from its desired position of one-half of one micro-inch. The output of the trigger circuit is applied to a winding 107 of the transducer 43 by means of a resistance-capacitance network 108 and a rectifier 109. The network 108 includes capacitor 110 and resistor 111 and serves to slow or prolong the application of the error correcting power to the transducer 43. Current through the coil 107 causes magnetostrictive core 112 to elongate in accordance with the power supplied to the coil 107, and the core 112, which rigidly connects the carriages 42 and 44, pushes the carriage 44 to the left, as viewed in FIG. 1, toward its desired position in which the thread 45a of the nut 45 is longitudinally centered relative to the thread 47a of the measuring screw 47. The duration of the power pulses of the trigger circuit are dependent on the duration of error signals coming to the trigger circuit. Normally sufficient correction to the nut 45 to bring the error under one-half micro-inch occurs almost instantaneously, and the trigger circuit is shut off. However, power continues to be supplied to the transducer from the resistance-capacitance circuit 108 in magnitude and duration dependent on the time constant of the circuit 108, which has the effect of keeping the nut 45 (and thereby the tool 46) within the one-half micro-inch range of accuracy for a longer period of time. The circuit 108 and the magnitude of the power output from the trigger circuit 92 are such that overshooting and hunting are prevented.

Synchronization of the drives of the feed screws 21 and 31 is effected by a numerical control system 131 forming a portion of the present invention and driving the screw 31 in response to command signals caused by selected rotations of the screw 21. The command pulses recorded on the helical magnetic track 29 are spaced apart selected angles according to the desired pattern.

The recording head 28 is carried with the carriage 22 so that it is maintained in engagement with the helical track, and as each recorded pulse on the track 29 comes to the head 28, the pulse is fed to a bi-directional counter 132. Sine wave slave pulses are recorded on a track 133 on drum or disc 134 fixed to the screw 31. These slave pulses are designated as response or monitor pulses. The sine wave is such that each crest is spaced from the succeeding (or preceding) crest the same predetermined angle which is equal to four times the angle through which the screw 31 is turned upon each stepping of the motor 32, which angle of screw movement moves the tool 46 a distance of about two and one-half micro-inches along the Y axis. Each time either a trailing edge or a leading edge of the sine wave on the track 133 travels past either playing magnetic head 135 or playing magnetic head 136, it sends a monitor pulse to the counter 132. The crests of the sine wave record on the disc 134 are spaced equally from each other completely around the periphery of the disc 134. The head 135 is spaced from the head 136 such a distance that the heads 135 and 136 are ninety degrees out of phase with respect to the sine wave on the track 133, and when either a trailing edge or a leading edge of the sine wave is picked up by the head 135 or the head 136 a pulse is sent to the counter 132. This arrangement of the heads 135 and 136 is a frequency multiplying system, four pulses being produced by each cycle of the sine wave.

When the counter 132 has received a command pulse from the head 28 and then receives a monitor pulse from one of heads 135 and 136, the counter 132 actuates a pulse generator 137 to actuate an electronic switching circuit 138 to send a driving pulse to the stepping motor 32 to step the drive screw 31 through an angle corresponding to one quarter of the angle subtended by one cycle of the sine wave on the disc 134. Each such step of the drive screw 31 is designated one increment of Y axis travel for the tool 46, and any error within the designated range either in the stepping motor drive or in the drive of the screw 31 is detected by the measuring nut 45 and screw 47 and is corrected by the transducer 43 as described above. The command pulses from the track 29 represent predetermined distances of travel of the work or blank 26 along the X axis.

To reverse the direction of travel of the tool 46 along the Y axis at a predetermined point in the cutting or turning operation, an electronic settable counter 161 is provided. The counter 161 receives each monitor pulse from the disc 134, and after the number of pulses for which the counter 161 is set has been received by the counter 161, it actuates the switch 138 to reverse the polarity of the driving pulses to the motor 32 to thereby reverse the direction of drive of the drive screw 31. Then for each pair of command and monitor pulses received by the counter 132, the motor 32 is stepped to move the tool 46 to the right, as viewed in FIG. 1.

The function of the monitor pulses from the disc 133 is to stop the motor 32 after the screw 31 has been turned through the desired increment from each command pulse. The monitor pulses also stop the entire machine in the event that, due to some malfunction, the drive of the tool 46 either overshoots or lags too far behind the drive of the work by the screw 21. If a selected number of successive command pulses are received by the counter 132 with no intervening monitor pulse, the counter 132 pulses a shutdown switch 162 to shut off power from the motors 20 and 25. Likewise, if two successive monitor pulses are applied to the counter 132 with no intervening command pulse, the counter 132 sends an actuating pulse to the electronic switch 162 to stop the motors 20 and 25.

To initially record the pulse producing signals on the magnetic track 29 in the desired pattern to cause the machine to produce the aspheric curve 26a, there may be utilized a translator system disclosed and claimed in co-pending application Serial No. 48,007, filed on the same date as this application and assigned to the common assignee. This translator system is actuated by a tape perforated to cause electromagnetic pulses in a magnetic recorder thereof which has a recorder head in the position of the head 28 to be recorded on the track 29. The translator is set up by the tape to supply a command pulse to the track 29 when the translator receives a selected number of pulses from a set up disc 165 having a magnetic recorder track 166 and a playback head 167. The disc 165 is keyed to the screw 21 and the track has a recording thereon which produces an output pulse in playback head 167 each time the screw 21 turns through a predetermined angle. The perforated tape sets up the translator system so that with the pulses from the disc 165, the selected pulse-producing pattern on the track 29 is produced. The pulses from the disc 165 may be considered as counter pulses, one pulse for each turn of the screw 21 through a very small predetermined angle. The translator system is actuated by the perforated tape to record output pulses on the track 29 after receiving selected numbers of counter pulses from the disc 165, the number of counter pulses for each succeeding output pulse being determined by the perforated tape to produce the desired pattern of spacing of the pulses on the track 29.

Figure 2:
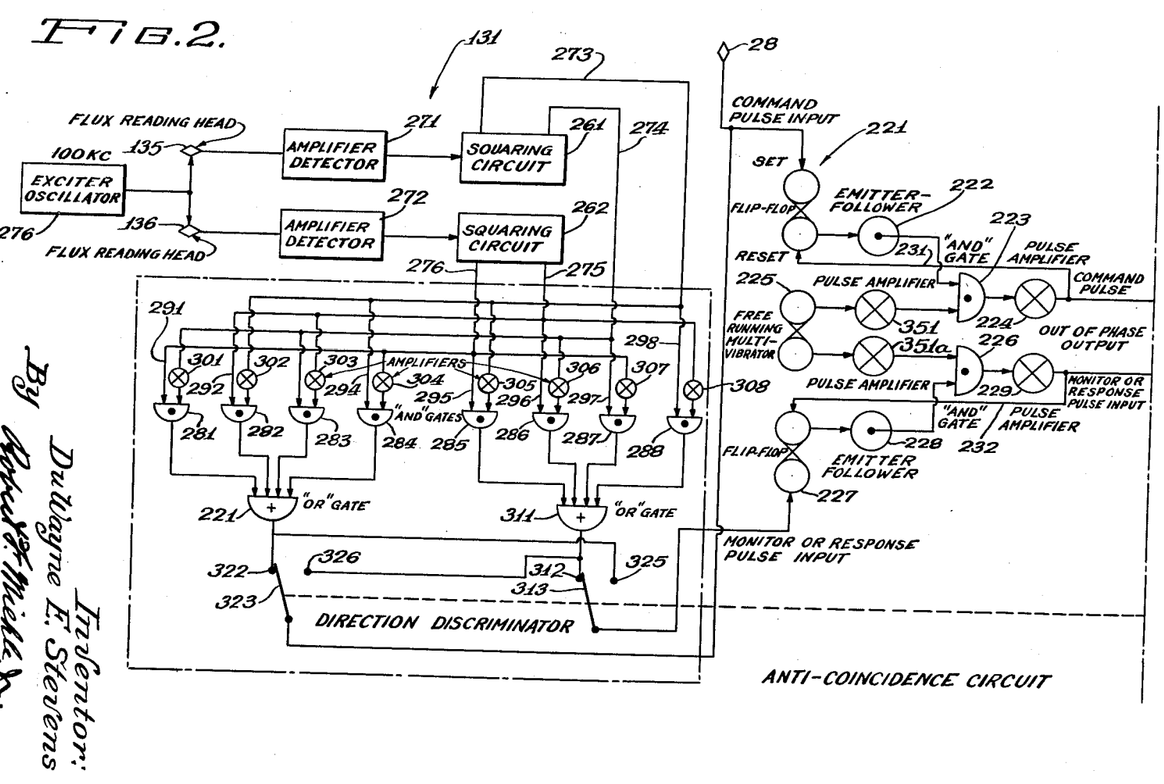
FIGS. 2 and 2A when fitted together along their broken lines show a wiring diagram of the numerical control system of FIG. 1.

To prevent loss of either a command pulse or a monitor pulse when the two pulses come to the counter 132 simultaneously, an anti-coincidence circuit forming the input of the counter 132 is provided and is shown in block diagram in FIG. 2. The command pulse comes in to a known flip-flop circuit 221 to set the circuit to apply a signal voltage to an emitter follower circuit 222 and an "And" gate circuit 223. Before the pulse signal is applied to amplifier 224 and on into the counter 132 to actuate the counter, a pulse from a free running multivibrator 225 must be applied to the "And" gate 223, and the multivibrator alternately pulses the "And" gate 223 and "And" gate 226. Similarly, the monitor pulse actuates a flip-flop circuit 227 to set the circuit 227 in a pulse transmitting condition, and the pulse signal is fed through an emitter follower circuit 228 to "And" gate 226. When "And" gate 226 is so pulsed by the circuit 227 and is also pulsed by the multivibrator 225, a pulse is fed into the bi-directional counter 132 through amplifier 229. Each of the circuits 221 and 227 is set to a signal sending condition by receiving a pulse and stays in that condition until reset by a reset connection 231 or 232 as the pulse signal is transmitted from the amplifier 224 or 229 to the counter. Thus, the command and response or monitor pulses are always spaced apart as they are fed further into the bi-directional counter 132 even through arriving simultaneously at the anti-coincidence circuit. The free running multivibrator 225 has a frequency several times as great as the maximum frequency of either the command pulses or the monitor pulses so that there is never any danger of losing a pulse.

Figure 2A:
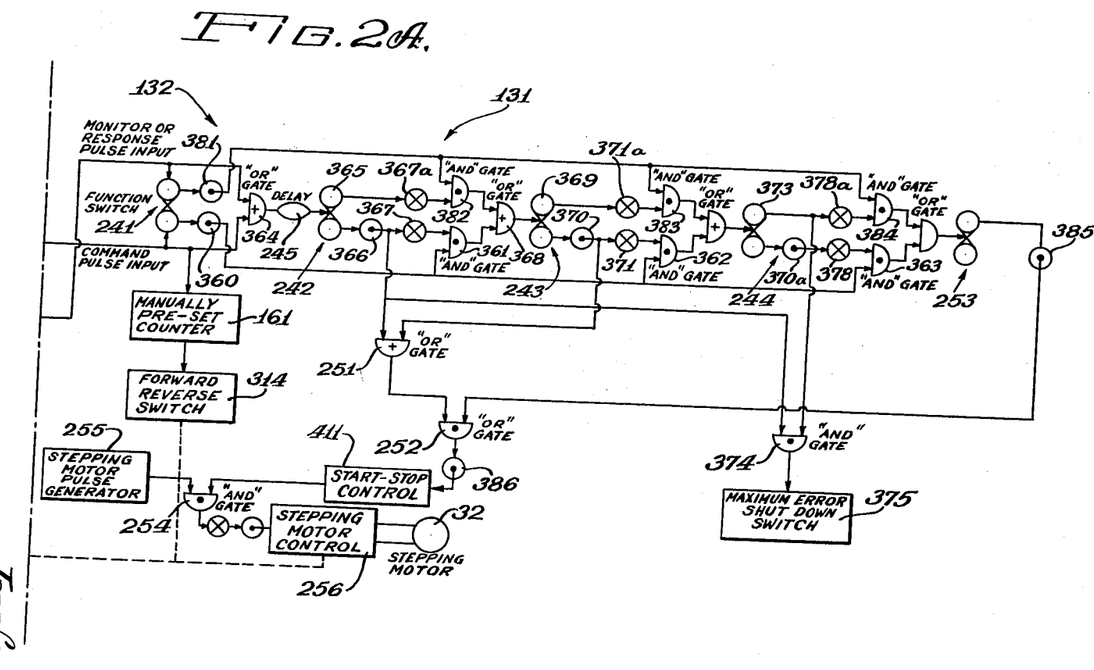

The bi-directional counter 132 is connected such that the command pulses generated by the rotation of the drum 30 on the X axis lead screw 21 cause the count to add, and the monitor or response pulses generated by the responding rotation of the monitor disc or quantizer 134 on the Y axis subtract from the command count. Thus, the system strives to maintain zero balance in the counter 132 at all times. The scheme of the counter is shown in FIG. 2A. Entry of a command pulse causes a known binary switch 241 to flip, and set up the interstage gating between known counter flip-flop stages 242, 243 and 244 such that a carry pulse is transferred and the counter adds. Likewise, entry of a response or monitor pulse will shift the switch to the opposite condition, which causes the carry-borrow gating of the counter to transfer a borrow pulse and the counter subtracts by one count. The binary switch operates at a much faster speed than the counter flip-flops 242, 243 and 244 because of a known delay circuit 245 so that the gating is completed before the first counter flip-flop 242 can change state.

In monitoring the counter 132 to determine whether a command signal is present, the "one" state of all the binary stages is fed through a known "Or" gate 251 such that any value of a plus count registered will send a command signal to the stepping motor. To detect any possible overshoot of the response or monitor disc 134 by one increment which would cause the count to become negative, it is necessary to distinguish between a plus and a minus count. A minus count must not be recognized as a command signal. The output from the "Or" gate 251 is fed to one leg of a known "And" gate 252. The second leg of gate 252 is controlled by a known flip-flop stage 253 located in the counter beyond that of the maximum tolerable error in the system. The only time the flip-flop stage 253 will ever change from a "zero" to a "one" state is when the counter changes from a zero to a minus one count. The command signal is therefore inhibited on any negative or zero storage in the counter 132. A plus storage, however, opens gates 252 and 254 and allows known pulse generator 254 to step the motor 32 through a known control circuit 256.

One of the problems of readout in shaft angle quantizers, as in the disc 134 where high packing densities and slow speeds are involved, is that of mechanical vibration. The vibrations can momentarily reverse the direction of the coded disc 134 and cross the sharp leading or trailing edge of a pulse. Known trigger squaring circuits 261 and 262 (FIG. 2) which may be Schmitt trigger circuits, will recognize these extraneous pulses as forward motion of the quantizer disc 134, and a large error could be accumulated in a short time. This is especially true as far as the shallow slope portion of the aspheric lens is concerned. In order to prevent this type of error, a direction discriminator circuit 269 is incorporated as shown in FIG. 2. The reverse direction pulses are fed into the opposite side of the counter 132 to cancel any forward pulses that may be generated because of vibration. An example of this action is as follows: Let us take a point along the curve 26a where the "Y" increments are widely separated. Now suppose a command pulse enters the counter 132, producing an output which drives the stepping motor 32 until one response or monitor pulse nullifies the command pulse and the motor 32 stops. Further, suppose the disc 134 stops just beyond the threshold of the pulse just received. Any slight vibration could cause the disc 134 to oscillate back and forth through this threshold producing a series of unwanted response pulses. Therefore, each reverse direction pulse is fed to the counter 132 in such a manner as to count upward and each forward pulse counts downward we end up with the same number of effective monitor pulses as there are command pulses, which is necessary if an accumulative error is to be averted. To carry the reasoning one step further, if the period of oscillation is slow the disc 134 may back up, giving a negative pulse, and stay there long enough to trigger the stepping motor 32 one or two steps, representing less than one space between pulses or increments, this would carry the disc 134 in a forward direction beyond the pulse threshold in question, producing a pulse which nullifies the pulse created by its backward swing. Thus, the pulse in question would be used only once, which is as it should be.

The direction discriminator circuit 269 also includes means adapted to amplify, square and differentiate the sine wave signals from the disc 134 and the flux reading heads 135 and 136. A high frequency carrier signal is supplied by known exciter oscillator 270 to the heads 135 and 136 and the mixed amplitude modulation carrier signal and much lower frequency response or monitor signals are fed along parallel paths from the heads 135 and 136 to the known pulse squaring circuits 261 and 262 through known amplifier-detectors 271 and 272, which amplify the received mixed signals and detect the monitor pulses. The two amplified sine wave monitor signals are fed to the circuits 261 and 262 ninety degrees out of phase, and the circuits square these waves to provide square wave outputs.

The outputs of the circuits 261 and 262 are identical except that the output signal from one of these circuits lags that from the other by ninety degrees and the outputs are gated and differentiated similarly in the direction discriminator circuit 269. A square wave output signal is fed by the circuit 261 to conductor 273, and an identical square wave output signal one hundred and eighty degrees out of phase from that fed to conductor 273 is supplied to conductor 274. These two square wave signals are differentiated at the leading edges thereof to produce signal pulses and the differentiated pulses from the signals from the circuit 261 are gated by the similar output signals from the circuit 262, the latter signals being ninety degrees out of phase from the signals of the circuit 261 so as to provide excellent gating for the differentiated pulses from the circuit 261. The circuit 262 feeds square wave signals one hundred and eighty degrees out of phase from one another to conductors 275 and 276, these signals lagging the corresponding signals on the conductors 273 and 274 by ninety degrees.

Known "And" gates 281 to 288 have gating pulse inputs 291 to 298 and known amplifiers 301 to 308 provide signal pulse inputs to the gates 281 to 288. The amplifiers 301 to 308 are of a type which will differentiate the positive going leading edges of the pulses from the squaring circuits 261 and 262 and pass the resulting differentiated pulses to the "And" gates 281 to 288 for transmission through these gates when proper gating signals are being applied to these gates simultaneously therewith. The amplifiers 301 to 308 will not form and transmit pulses from the negative going trailing edges of the square wave pulses. Thus, as one of the square wave pulses goes from its low voltage level to its high voltage level, the amplifiers to which it is transmitted transmit pulses to the "And" gates, and, conversely, whenever one of the square wave pulses goes from positive to negative, the amplifiers receiving that signal do not transmit any pulse to the "And" gates at their outputs.

Assuming the drive of the tool 46 to be forward (to the left, as viewed in FIG. 1) and the disc 134 to be moving in the forward direction, while the square wave pulse on the conductor 273 (FIG. 2) is at its gating voltage level, the square wave pulse on conductor 275 changes sharply in its voltage level to the proper direction to actuate the amplifiers 303 and 308. As these two conditions occur, the gate 288 receives the pass or gating signal from conductor 273 and the signal pulse from conductor 275 and amplifier 308 and the response or monitor pulse passes on through the gate 288, known "Or" gate 311, relay contact 312 and contactor 313 of the stepping motor control 256 as actuated by the forward reverse switch 314, to the flip-flop circuit 227. While the pass gating signal on the conductor 273 at this time also is applied to the gate 284, the signal on the conductor 276 is changing in a direction opposite to that necessary to actuate its associated amplifiers which will not pass this type of pulse. Next, on further forward rotation of the disc 134, the signal on the conductor 274 goes sharply in the proper direction to actuate the amplifiers 301 and 306 connected therewith while the signal on the conductor 273 does the opposite, and, the signal on the conductor 275 being in the central portion of its gating level, a response or monitor pulse is passed through known gates 286 and 311 to the flip-flop circuit 227. Next, on further forward rotation of the disc 134, the gate 287 receives its gating signal from the conductor 274 and the amplifier 307 and pulse from the conductor 276 and the amplifier 307 and passes the response pulse to the flip-flop circuit 227, the signal pulse to the amplifier 304 being such as to pass the amplifier 304 and gate 284 but there is a not pass or non-gating signal on the conductor 273 at this time so that no signal passes gate 284. Also, at this time, the pulse signal from the trailing edge of the pulse on conductor 275 will not pass the amplifiers 303 and 308, and the signals on the conductors 273 and 274 are not changing so that no pulses are formed by amplifiers 301, 302, 305 and 306. Next, on further forward rotation, the voltage level on the conductor 273 rises sharply from its low level to its high level and, the voltage level at this time being at the gating level on the conductor 276 to provide the gating pulse to gate 285, a response or monitor pulse passes through the gates 285 and 311 and the contacts 312 and 313 to the counter 132 to actuate the counter. The other signals on the other conductors 274 and 275 are such that no other signal passes the other gates 281 to 284 and 286 to 288, the voltage level on the conductor 275 being steady but non-gating and the pulse on the conductor 274 being of polarity which will not go through the amplifiers 301 and 306.

If the disc 134 should now reverse its direction just after the response pulse passed through the gate 305, the level on the conductor 276 still is at gating and that on the conductor 275 is non-gating. However, on the reverse rotation of the disc 134 the signal or response pulses on the conductors 273 and 274 are opposite to that just described above, the sharp change in voltage level on the conductor 274 being such as to actuate the amplifier 301 to feed a response pulse to the gate 281 and that on the conductor 273 being of the opposite direction such as to be unable to pass through its associated amplifiers 302 and 305. The response pulse from the gate 281 passes through known "Or" gate 321 and relay contact 322 and relay contactor 323 of the stepping motor control 256 to the flip-flop circuit 221 of the counter 132, which acts as a substracting pulse on the counter as described above. Continuing in the reverse direction of the disc 134 for the remainder of the cycle, first the voltage level on the conductor 275 changes in the proper direction to actuate its amplifiers 303 and 308, only the gate 283, however, receiving a gating pulse. Then the voltage level on the conductor 273 changes sharply in the direction such as to actuate the amplifiers 302 and 305 to form response pulses. However, the voltage level on the conductor 276 at this time is non-gating and only that on the conductor 275 is gating so only gate 282 passes the response pulse which travels to the flip-flop circuit 221 to act as a subtracting pulse to the counter 132. Next, there is an amplifier actuating voltage change on only the conductor 276 and only the conductor 273 is at the gating level so only the gate 284 passes a response or monitor pulse and this pulse travels to the flip-flop circuit 221 to act as a subtract pulse to the counter 132.

The above description illustrates the action of the direction discriminator 269 when the relay contactor 313 and 323 are set in the forward direction of movement for the tool carriage 44. However, if the curve 26a is to reverse its slope at a predetermined point in the travel of the lens blank 26 along the X axis, the known counter 161 is set to actuate the switch 314 after the counter 161 has received a predetermined number of command pulses corresponding to that point in the travel of the work along the X axis. When the counter 161 receives the last of these pulses, it actuates the forward-reverse switch 314 to actuate the stepping motor control 256 to reverse the direction of drive of the stepping motor 32 and move relay contactor 313 away from contact 312 and into contact with contact 325 and relay contactor 323 out of engagement with contact 322 and into engagement with contact 326. This causes the response or monitor pulses from the gates 281 to 284 now to go to the flip-flop circuit 227 to act as true response pulses and the gates 285 to 288 to be connected to the flip-flop circuit 221 to pass subtracting pulses to the counter 132 in the event the disc 134 should accidentally rotate in the forward direction. It should be noted that only pulses occurring from reverse rotation of the disc 134 pass through the gates 281 and 284 while only pulses occurring from forward rotation of the disc 134 pass through the gates 285 to 288.

To illustrate the operation of the counter 132 in more detail, the following description is being made. Assuming that the movement of the work carriage is occurring along the X axis and, due to a breakdown or faulty operation, the tool carriage 44 is not being fed so that a series of command pulses come to the counter 132 with no alternate response or monitor pulses being received, each command pulse actuates the flip-flop circuit 221 to produce a gating pulse to the emitter-follower circuit 222 and the gate 223 to cause the latter to pass a signal pulse from the multivibrator 225, which is amplified, resets the flip-flop circuit 221, and actuates the binary counter circuit 241 to apply a gating level voltage through known emitter-follower circuit 360 to known "And"

gates 361, 362 and 363. The command pulse also goes through known "Or" gate 364 and the time delay circuit 245, which delays it a few microseconds, after which the pulse goes to a known flip-flop or binary counter circuit 365 to change the circuit 365 from a zero condition to a plus one condition. This is a negative going change which will not go through the gate 361. The next and second command pulse, assuming no intervening response pulse, actuates the circuit 222 to provide a gating pulse to pass the multivibrator pulse which resets the circuit 221, actuates the circuit 241 to apply a gating level to the gates 361, 362 and 363, and passes through gate 364 and delay circuit 245 to the flip-flop circuit 365 to change the circuit 365 from its plus condition of a low voltage level to its zero condition of a high voltage level. This change is of the proper direction to cause a pulse to travel through known emitter-follower circuit 366, known pulse amplifier circuit 367, the "And" gate 361, known "Or" gate 368 and actuate known flip-flop circuit 369 of counter stage 243. This changes the circuit 369 from its zero condition to its plus one condition, which change is negative going and not proper to travel through known emitter-follower circuit 370, known amplifier 371 and gate 362 and the circuit 369 stays in its plus condition. The next or third command pulse actuates the counter 365 from zero to plus, no pulse traveling through gate 361, to register a count of three on the counters 242 and 243. Then the fourth command pulse goes through the gates 361 and 368 to change the circuit 369 from plus back to zero, this change being from a low voltage level to a higher one to provide a pulse of correct polarity to pass the "And" gate 362 and "Or" gate 372, which it does to actuate known flip-flop circuit 373. The circuit 373 then applies a gating pulse to known "And" gate 374. On the next or fifth consecutive command pulse, the counter 242 sends a signal pulse through the gate 374 to actuate a known switching circuit 375 to stop the drive motor of the work feeding carriage, which stops the entire machine.

If, before the fifth consecutive command pulse occurs, a monitor or response pulse occurs, the response pulse actuates the flip-flop circuit 241 to apply a gating pulse through known emitter-follower circuit 381 to set up known gates 382, 383 and 384. This response pulse also travels through the gate 364 to actuate the flip-flop or binary counter circuit 365 to reverse its state, thereby substracting one from the counter circuit 365. Further response pulses further subtract from the counters.

If at any time, with the counters 242, 243 and 244 at zero count, a response pulse occurs, it actuates the flip-flop circuit 241 to reverse its condition to send an enabling gating pulse 241 to gates 382, 383 and 384. The response pulse also actuates the flip-flop circuits 365, 369, 373 and 253 consecutively, the pulse outputs of the flip-flop circuits 365, 369 and 373 being of the proper polarity to pass the respective gates 382, 383 and 384. The pulsing of the flip-flop circuit 253 causes it to go to a non-gating voltage level through known emitter-follower circuit 385 to "And" gate 252 which passes a signals thereon from the circuit 385. This passed signal goes through known emitter-follower circuit 386 from which it goes as a non-gating signal to block motor stepping pulses from the motor pulse generator 255 so that there is no feed of the tool 46 along the Y axis until the work feed along the X axis catches up and in doing so feeds two command pulses to the counter 132, the first of these serving to reverse the circuit 241 to take the gating pulse off the gates 382, 383 and 384 and reverse the circuit 365, thereby setting the counter to zero from its previous minus one count condition. The second command pulse then actuates the counter 132 and applies a gating pulse to the gate 254 to permit the normal three pulses from the generator 255 to pass to the stepping motor control 256 and the motor 32.

Figure 3:
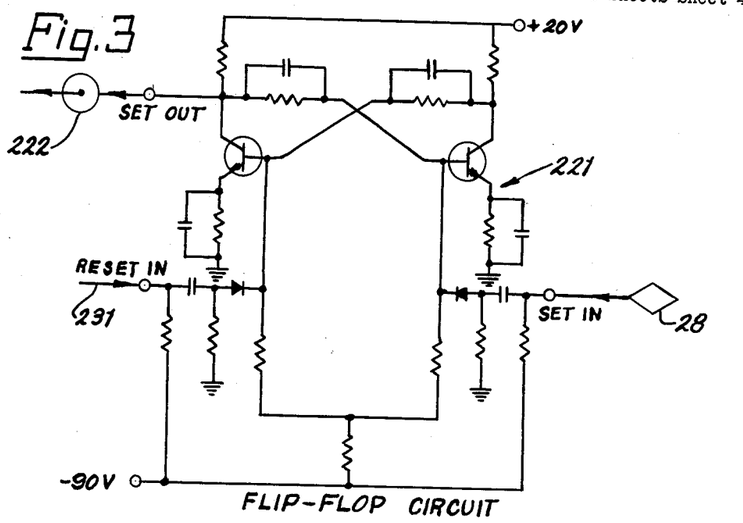
FIGS. 3 through 13 illustrate appropriately labelled wiring diagrams of component circuits of the wiring diagram of FIGS. 2 and 2A.
Figure 4:
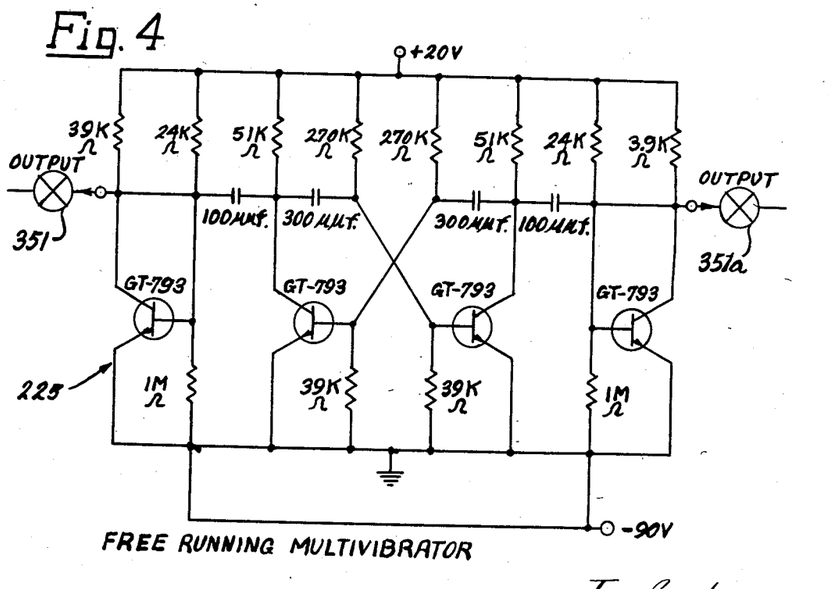
Figure 5:
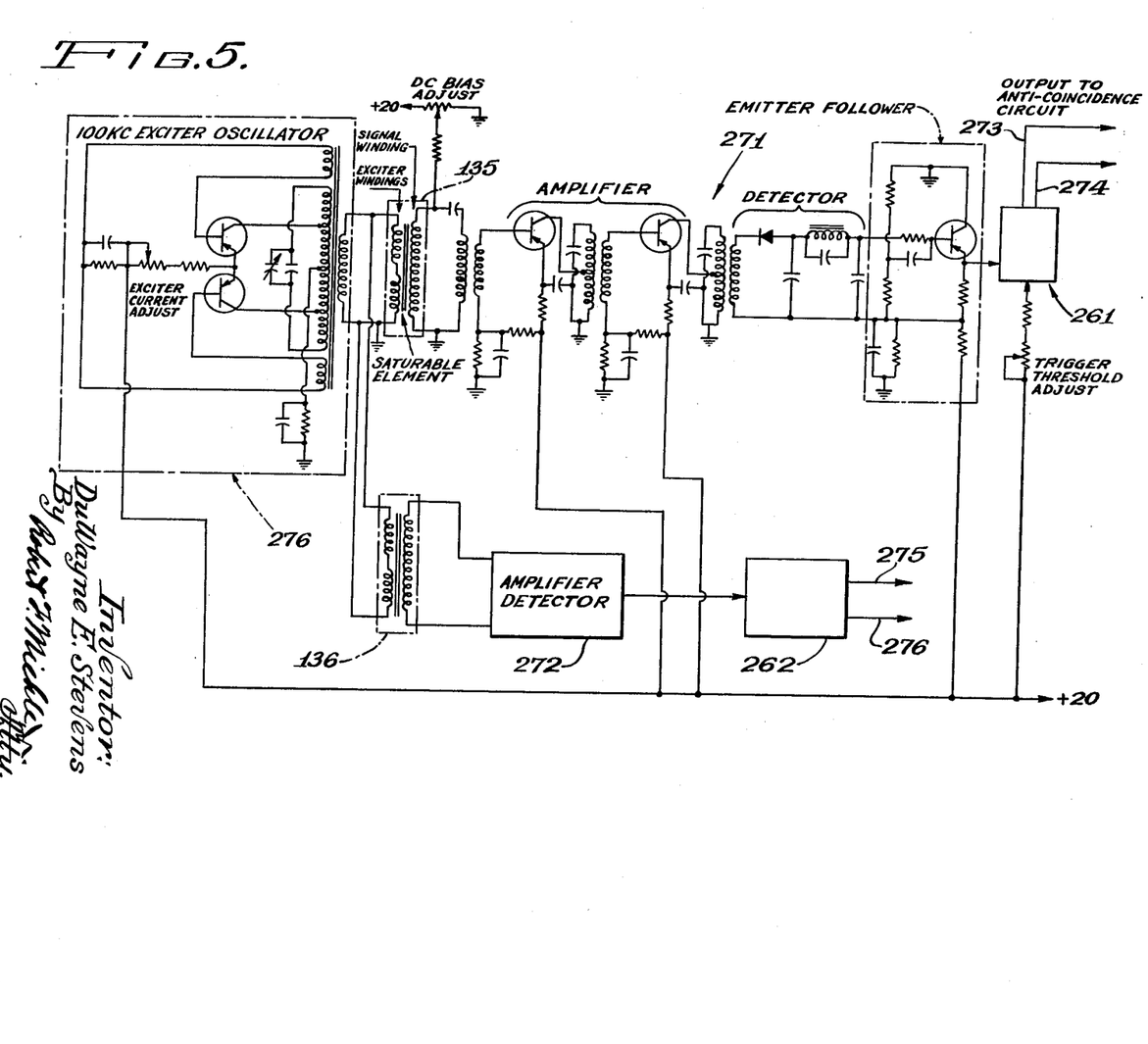

The several gates, amplifiers, amplifier-detectors, squaring circuits, flip-flop circuits, emitter-followers and the like described above are commercially available units well known in the art, as are the oscillator 276, shut down switch 375, stepping motor control 256, pulse generator 255, switch 314, and counter 161. The specific circuits are known in FIGS. 3 to 14. In FIG. 3 the flip-flop circuit 221 is shown, this circuit being identical in construction to that of circuit 227. The circuits 221 and 227 are commercially available units, one such circuit being Model FF-103 marketed by the Computer Control Corporation. The multivibrator 225 (FIG. 5) is shown in detail and has outputs to amplifiers 351 and 351a to which the signals therefrom are alternately applied. In FIG. 5 the constructional details of the components 135, 136, 271, 272 and 276 are disclosed in detail. The circuits 261 and 262 being Schmitt trigger circuits which are commercially available, one such circuit being Model ST-102 of Computer Control Corporation.

Figure 6:
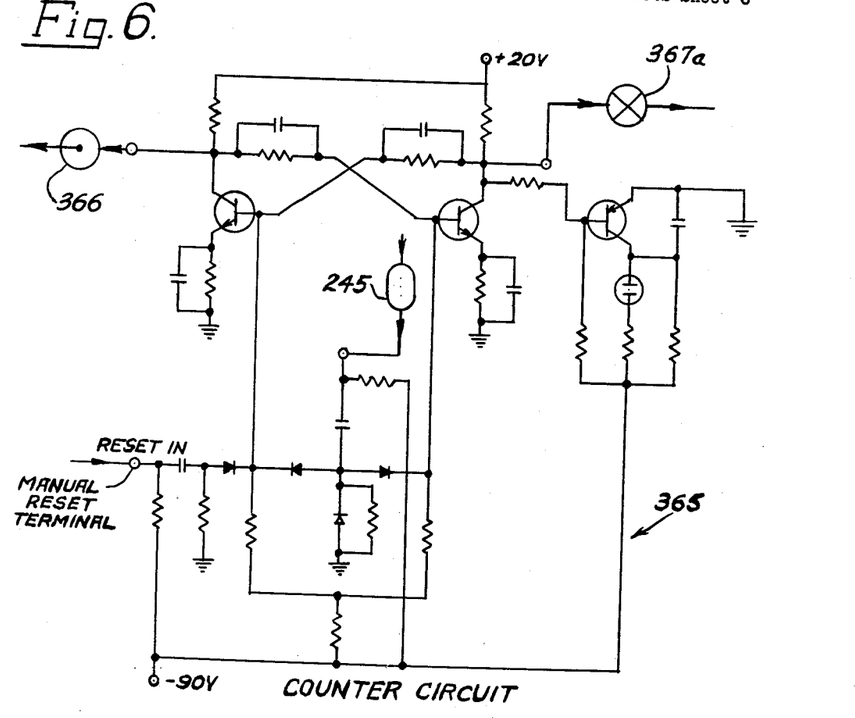
Figure 7:
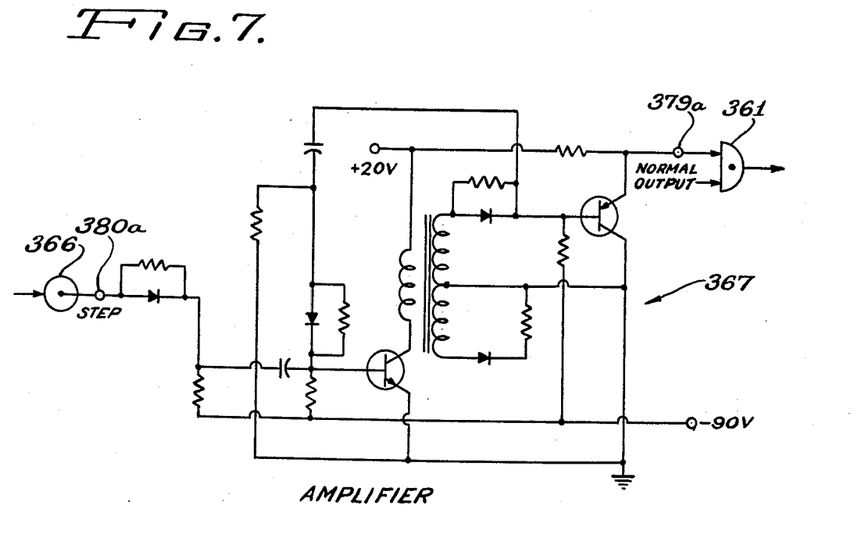
Figure 8:
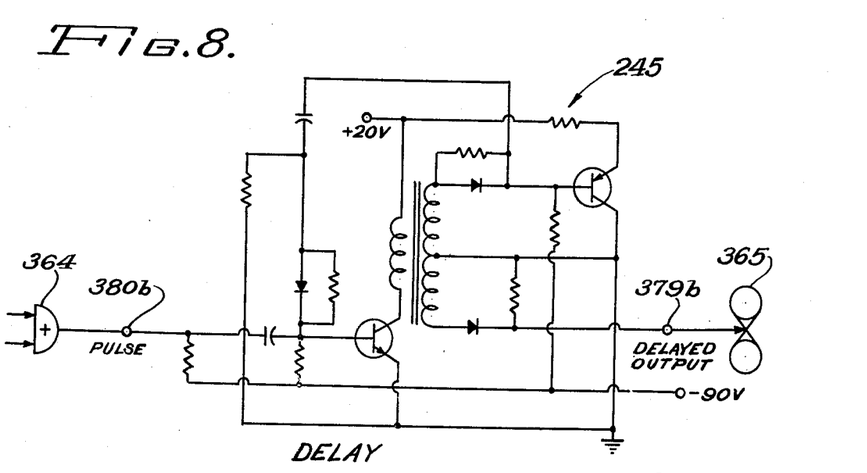

The flip-flop circuits 365, 369, 373 and 353 are of identical construction, the circuit 365 being shown in detail in FIG. 6 and having alternately operable outputs to the emitter-follower circuit 366 and amplier 367a. The circuit 365 is commercially available, one such circuit being the above mentioned Model FF-103 of the Computer Control Corporation. Pulse amplifiers such as Model PA-104 of the Computer Control Corporation may be used for amplifiers 367, 367a, 351, 351a, 301 to 307, 224, 229, 378 and 378a and also for the delay circuit 245, the "Normal Output" terminal 379a (FIG. 7) being used for the amplifier output and the "Delayed Output" terminal 379b (FIG. 8) being used for the delay circuit. Also, for the amplifiers, "Step" input 380a (FIG. 7) is used, and, for the delay circuit, "Pulse" input 380b (FIG. 8) is used.

Figure 9:
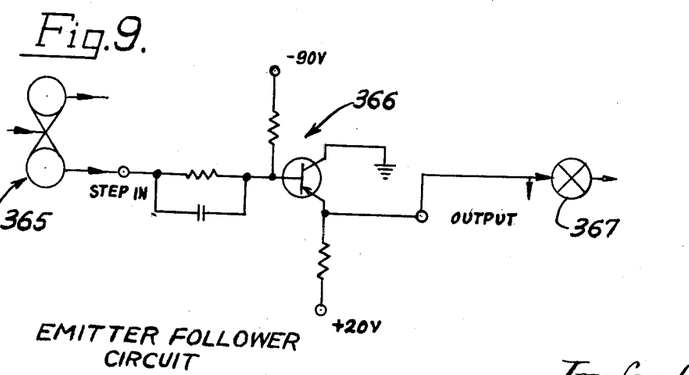
Figure 10:
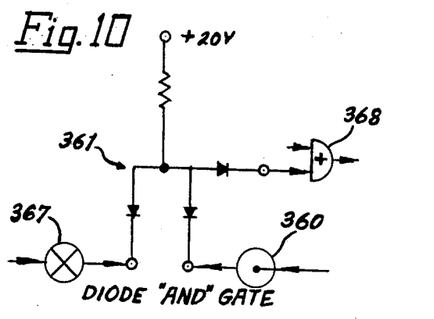
Figure 11:
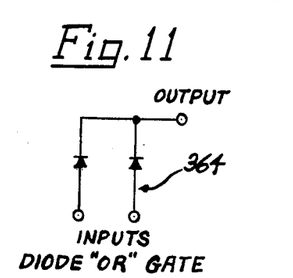
Figure 12:
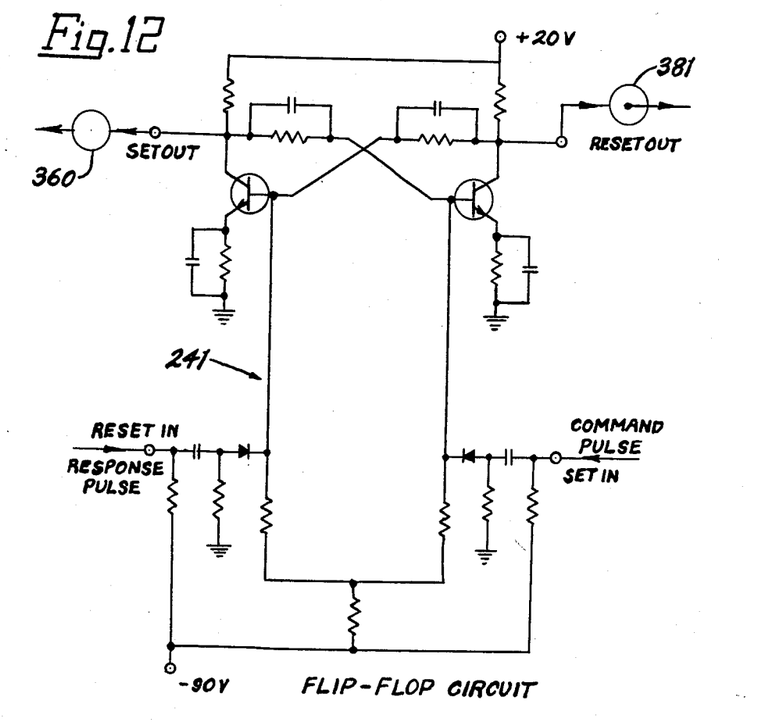

The emitter-follower circuits such as the circuits 222, 228, 360, 381, 366, 370, 370a, 385 and 386 (FIGS. 2 and 2A) may be of the type shown in FIG. 9, the circuit 366 shown therein being Model EF-101 of the Computer Control Corporation. The diode "Or" gates are illustrated in FIG. 11 by the gate 364 and the diode "And" gates are disclosed in detail in FIG. 10 by gate 361. The function switch 241 is disclosed in detail in FIG. 12, and may be the circuit unit Model FF-103 marketed by the Computer Control Corporation.

Figure 13:
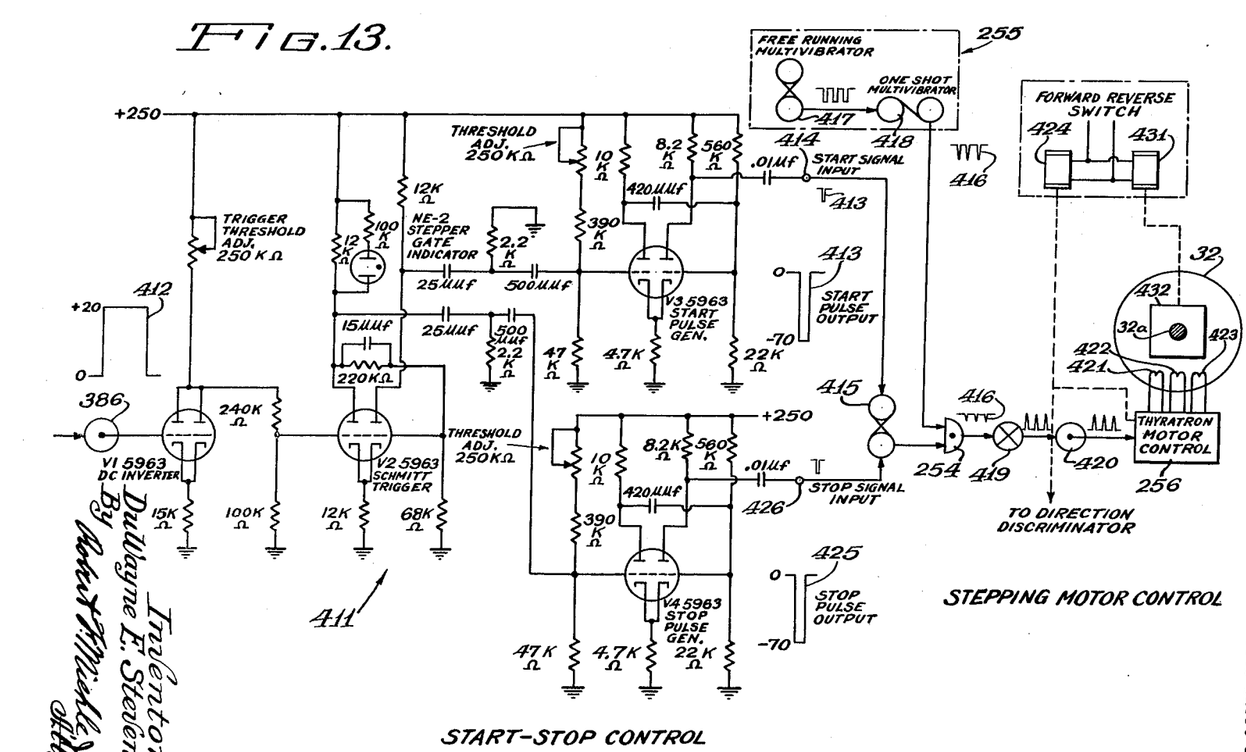

In FIG. 13 there is shown a start-stop control 411 which controls the duration of the pulsing of the motor 32. Actuating pulse 412 from the emitter-follower circuit 386 causes a pulse 413 coincident with the leading edge of the pulse 412 to pass through output terminal 414 to known flip-flop gate control 415 to enable gate 254 to pass three pulses 416 from the pulse generator 255, which includes known multivibrators 417 and 418. The pulses 416 travel through the gate 254, known inverter-amplifier 419, and known cathode-follower circuit 420 sequentially to windings 421, 422 and 423 to step the motor 32 one step in a direction determined by relay 424 having direction controlling contacts (not shown) in known motor control 256. The control 256 may be Model S-18, Type B-1 of Pace Controls Corporation. After three pulses have been supplied to step the motor 32 one step, a stop pulse 425 coincident with the trailing edge of pulse 412 is applied by the known circuit 411 to output terminal 426 to actuate the flip-flop circuit 415 to shut off the gate 254 to stop pulses to the motor 32.

The counter 161 (FIG. 2A) is of the decimal type and is well known in the art to which the invention relates. The counter 161 upon receiving a predetermined number of pulses, applies an output pulse to known forward-reverse switch 314. The switch 314 is actuated by this pulse to reverse the condition of the relay 424 and the solenoid 431 from de-energized to energized. The relay then reverses the connections to the windings 421, 422 and 423 to cause the motor 32 to drive in the reverse direction and also reverses the condition of the direction discriminator (FIG. 2) contacts 312, 313, 325, 322, 323 and 326 as described above. The solenoid 431 by its change of condition reverses a known directional braking device 432. The device 432 may be of the type having two one-way clutches with one being brought into operation at one time to keep motor shaft 32a from rotating backward for one direction of drive of the shaft and the other clutch preventing backward rotation of the shaft 32a during the time when the shaft is to be rotated in the other direction.

Certain features of the above described machine are disclosed and claimed in co-pending application Serial No. 48,024, filed on the same day as this application by Gerhard Lessman and assigned to the common assignee, co-pending application Serial No. 47,992, filed on the same day as this application by Marvin F. Royston and assigned to the common assignee, and co-pending application Serial No. 48,148, filed on the same day as this application by DuWayne E. Stevens and assigned to the common assignee.

While the invention is thus described, it is not wished to be limited to the precise details described, as changes may be readily made without departing from the spirit of the invention.

What is claimed is:

1. In a numerical control system, a plurality of binary counter stages each operable to supply a borrow pulse when in zero state and a carry pulse when in a one state, a source of command pulses, a source of response pulses, borrow gating connecting the borrow pulse outputs of the counter stages in cascade and enabled by each response pulse received, carry gating connecting the carry pulse outputs of the counter stages in cascade and enabled by each command pulse received, means connecting the sources of command and response pulses to the first of the counter stages connected in cascade, a function switch operable by each response pulse to enable the borrow gating and operable by each command pulse to enable the carry gating, and control means operable by a borrow pulse occurring in one of the counter stages upon the occurrence of predetermined plus count in the counter stages.

2. The numerical control system of claim 1 wherein there is provided an anti-coincidence circuit for delaying one of a command pulse and a response pulse occurring substantially simultaneously and then feeding the delayed pulse to the counter so that the pulses arrive at the counter sequentially rather than simultaneously.

3. The numerical control system of claim 1 wherein there is provided a second control means operable by a borrow pulse from the last of the counter stages occurring upon a minus one count in the counter stages.

4. In a circuit, a record, sine wave reproducing means for supplying a first sine wave signal when the record is driven in one direction and when the record is driven in the opposite direction supplying the same sine wave signal but with the leading and trailing edges reversed, second sine wave reproducing means for supplying a second sine wave signal ninety degrees out of phase relative to the first signal when the record is driven in said one direction and when the record is driven in said opposite direction supplying a sine wave signal the same as the second sine wave signal but with the leading and trailing edges reversed, a first squaring circuit for squaring the first sine wave signal, a second squaring circuit for differentiating the second sine wave signal, first gating means enabled by one level of the squared first sine wave signal for passing one of the leading and trailing edges of the squared second sine wave signal, and second gating means enabled by one level of the square second sine wave signal for passing one of the leading and trailing edges of the squared first sine wave signal.

5. In a circuit, a first reversible sine wave producing means for producing a first sine wave signal, a second reversible sine wave producing means for producing a second sine wave signal ninety degrees out of phase from the first sine wave signal, a first squaring circuit for converting the first sine wave signal to first and second square wave signals one-hundred-eighty degrees out of phase from one another, a second squaring circuit for converting the second sine wave signal to third and fourth square wave signals, a plurality of amplifiers including a pair in parallel for differentiating each square wave pulse, a plurality of "And" gates one for each amplifier for passing the differentiated pulse when enabled, and connecting means connecting the squaring circuits to the "And" gates to enable and "And" gates supplied by one squaring circuit by levels of the square waves from the other squaring circuit.

References Cited in the file of this patent

UNITED STATES PATENTS

| | | |
|---|---|---|
| 2,817,775 | Rosenberg et al. | Dec. 24, 1957 |
| 2,833,941 | Rosenberg et al. | May 6, 1958 |
| 2,840,309 | Hunt | June 24, 1958 |
| 2,864,010 | Rosenberg et al. | Dec. 9, 1958 |